United States Patent [19]
Yokoyama et al.

[11] Patent Number: 5,509,309
[45] Date of Patent: Apr. 23, 1996

[54] ACCELERATION MEASURING DEVICE

[75] Inventors: Shotaro Yokoyama; Akira Amano; Kazuo Matsuzaki, all of Kawasaki, Japan

[73] Assignee: Fuji Electric Co., Ltd., Hino, Japan

[21] Appl. No.: 346,864

[22] Filed: Nov. 30, 1994

[30] Foreign Application Priority Data

Dec. 1, 1993 [JP] Japan .................. 5-300718

[51] Int. Cl.$^6$ ..................................... G01P 15/00
[52] U.S. Cl. ..................... 73/514.09; 73/514.25
[58] Field of Search .................... 73/516 LM, 516 R, 73/517 R, 517 A, 514.09, 514.25

[56] References Cited

U.S. PATENT DOCUMENTS

| | | | |
|---|---|---|---|
| 3,084,557 | 4/1963 | Ahlefeldt | 73/514.09 |
| 3,106,678 | 10/1963 | Lynn | 73/517 R |
| 3,110,185 | 11/1963 | Hughes . | |
| 3,360,677 | 12/1967 | Stocker et al. | 73/516 LM |
| 3,910,122 | 10/1975 | Evans et al. | 73/517 A |
| 3,910,123 | 10/1975 | Evans et al. | 73/517 A |
| 4,707,927 | 11/1987 | Hiyama | 73/514.09 |
| 4,783,690 | 11/1988 | Walden et al. | 357/23 |
| 4,941,353 | 7/1990 | Fakatsu et al. | 73/516 LM |
| 5,091,664 | 2/1992 | Furuhata | 307/570 |
| 5,097,302 | 3/1992 | Fujihira et al. | 357/23 |

OTHER PUBLICATIONS

"Fabrication and Characterization of Lateral Field–Emitter Triodes" by Kanemaru et al.; IEEE Transactions on Electron Devices, vol. 38, No. 10, Oct. 1991, pp. 2334–2336.

*Primary Examiner*—Hezron E. Williams
*Assistant Examiner*—Richard A. Moller
*Attorney, Agent, or Firm*—Brumbaugh, Graves, Donohue & Raymond

[57] ABSTRACT

An acceleration measuring device consists of a sealed-off, diode vacuum tube which in turn contains a cold cathode and an anode positioned at opposing longitudinal end regions of the vacuum tube via an inter-electrode space C. An inert argon gas is sealed in the vacuum tube at the pressure of 1 mm Hg. Because the acceleration measuring device utilizes field effect electron emission phenomenon, i.e., quantum mechanical tunneling by the Schottky effect, from the cold cathode, one obtains electron-emission characteristics which are essentially temperature independent. The vacuum tube also includes one or more areas connected to the interelectrode space, local density of the gas in which connected areas changes in response to acceleration experienced by the acceleration measuring device, whereby the density of the gas in the inter-electrode space is altered. Since the density of the gas in the inter-electrode space between the mutually opposing electrodes corresponds essentially linearly to the impedance against the electron flow towards the anode, the anode current is inversely proportional to the density of the gas in the inter-electrode space. The magnitude of the acceleration is measured by detecting the variation of the anode current.

20 Claims, 4 Drawing Sheets

ACCELERATION MEASURING DEVICE

BACKGROUND OF THE INVENTION

The present invention relates to an improved acceleration measuring device, and more particularly to an acceleration measuring device which utilizes the cold cathode electron emission phenomenon.

Shown in FIG. 7 is a sectional view of a prior art semiconductor acceleration measuring device, hereinafter referred to as an accelerometer, manufactured by utilizing the micro-machining technique. This semiconductor accelerometer is described in *Nikkei Mechanical*, pp. 62–64 (December 1987), and the micro-machining technique utilized in the manufacture of this semiconductor accelerometer is described in *Semiconductor World*, pp. 62–64 (March 1992). This semiconductor accelerometer consists of a semiconductor chip 2 fixed inside a ceramics package 1 and immersed in silicone oil 1a.

The semiconductor chip 2 shown in FIG. 7 consists of a base disk portion 3, a sensor chip 4 connected to one end of the base disk portion 3, and a stopper portion 5 connected to the other end of the base disk portion 3. The sensor chip 4 consists of two thick end portions connected by a thin middle portion. One of the thick end portions of the sensor chip 4 is connected to the base disk portion 3, and a weight film 4b made of, for example, gold is deposited on top of the other thick portion, designated as 4a in FIG. 7, of the sensor chip 4. In addition, a plurality of independent semiconductor gauge layers which constitute a Wheatstone bridge circuit are formed on a major face of the sensor chip 4. A bonding wire is designated by the reference numeral 6.

When the semiconductor accelerometer is subject to acceleration, the thick portion 4a moves in response to inertial force. The plurality of semiconductor gauge layers are deformed as the thick portion 4a moves and generates a detection voltage indicative of the deformation (resistance variation) of the semiconductor gauge layers. By measuring the detection voltage, the magnitude and direction of the acceleration, i.e., the acceleration vector, are determined.

The above-described prior art semiconductor accelerometer is well suited for meeting small-size and mass production requirements. However, the above-described prior art semiconductor accelerometer has a major drawback: the prior art semiconductor accelerometer can not be used at high temperatures, i.e., above 150° C. Further, since the characteristics of semiconductors change greatly with temperature variation even at temperature ranges well below 150° C., the prior art semiconductor accelerometer cannot be practically used in most environments unless accompanied by a temperature compensation circuit. As a result of requiring a temperature compensation circuit, an operationally practical prior art semiconductor accelerometer is cumbersome to build and use.

It is an object of the present invention to provide an accelerometer which exhibits operational characteristics substantially independent of temperature variations in the environment.

It is another object of the present invention to provide an accelerometer which is well suited for mass production and meeting small-size requirements.

SUMMARY OF THE INVENTION

In attempting to solve the above-described problem of the prior art accelerometer, two potential approaches may be taken. One may attempt to utilize materials which exhibit excellent heat resistance and pertinent temperature independence characteristics. Alternatively, one may attempt to utilize an acceleration detection method which does not rely on physical property of solids. The present invention adopts an acceleration detection method which does not utilize physical property of solids.

The objects of the present invention are achieved by providing an accelerometer which utilizes the cold cathode electron emission phenomenon. An accelerometer according to the present invention includes a vacuum tube containing a cold cathode, an opposing anode facing the cold cathode, and a dilute gas filling an inter-electrode space between the cold cathode and the anode. Because the vacuum tube contains a gas, the interior of the vacuum tube is not technically a "vacuum." Accordingly, the term "vacuum tube" is used interchangeably with the term "sealed tube" in the present specification. The vacuum tube also includes a space, hereinafter also referred to as the gas-density-varying space, connected to the inter-electrode space for varying the density of the dilute gas in the inter-electrode space in response to acceleration experienced by the accelerometer. Typically, the space connected to the inter-electrode space is an area behind the cold cathode and/or a space behind the anode.

The diode vacuum tube is preferably a sealed-off tube or a micro vacuum tube manufactured by micro machining a silicon wafer. In one possible arrangement, only one anode is positioned opposite to the cold cathode, which functions as a field effect electron emitter. Alternatively, a plurality of anodes located at a uniform distance from the cold cathode are arranged in a circular pattern or in a three dimensional spherical pattern. Preferably, the cold cathode is a circular disk and the "anode" is a plurality of mutually separated anode disks in a circular pattern concentrically surrounding the cathode disk.

Since the density of the gas in the inter-electrode space between the mutually opposing electrodes corresponds essentially linearly to the impedance against the electron flow towards the anode, i.e., the collision cross section of the electron flow towards the anode, the anode current increases or decreases in response to a decrease or increase, respectively, of the density of the gas in the inter-electrode space when the density deviation between the inter-electrode space and the connected gas-density-varying space is triggered by acceleration. The magnitude of the acceleration is measured by detecting the variation of the anode current.

Since the accelerometer according to the present invention functionally combines field effect electron emission, i.e., quantum mechanical tunneling by the Schottky effect, and pinching of emitted electron flow associated with the gas density variation by the inertial force, several advantageous effects are obtained.

First, since the accelerometer of the present invention utilizes a cold cathode in place of a hot cathode utilized in the prior art arrangements, one obtains electron-emission characteristics which are essentially temperature independent. Since the variation of density of the gas in the inter-electrode space is enhanced by purely mechanical inertial force, the gas density variation is not affected directly by temperature variation. Therefore, the accelerometer according to the present invention is substantially independent of temperature variations of the environment.

In addition, the accelerometer according to the present invention, a micro vacuum tube manufactured via the micro-machining technique, is well suited for mass production and meeting small-size requirements, as well as resulting in cost reduction. It is quite efficient to manufacture the micro vacuum tube from a silicon substrate because the plurality of anodes may be simultaneously formed on the same substrate.

Further, due to the presence of the plurality of anodes, the accelerometer according to the present invention is particularly effective for detecting accelerations having multiple directional components, i.e., two- or three-dimensional acceleration, as well as being particularly effective in measuring the magnitude of the acceleration.

DETAILED DESCRIPTION OF THE INVENTION

Figure 1:
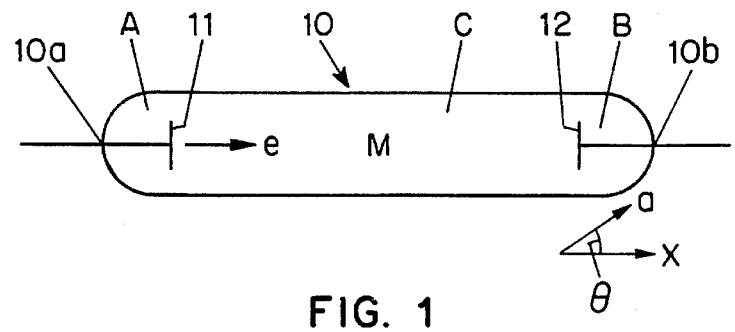
FIG. 1 is a sectional view showing the first embodiment of the accelerometer according to the present invention.

As shown in FIG. 1, a sectional view of the first embodiment of the accelerometer according to the present invention, the accelerometer is a miniature diode vacuum tube. The diode vacuum tube 10 is a sealed-off tube 5 mm in internal diameter and 20 mm in length. A cold cathode 11 is located at one end 10a of the sealed-off tube 10, and an anode, i.e., collector electrode, 12 is located at the opposite end 10b of the sealed-off tube 10, facing the cold cathode 11 via an inter-electrode space C. An inert gas Ar, designated by letter M, is sealed at a pressure of 1 mm Hg in the tube 10. The space between the one end 10a of the sealed-off tube 10 and the cold cathode 11 is designated by letter A, and the space between the other end 10b of the sealed-off tube 10 and the anode 12 is designated by letter B. The spaces A and B, referred to as the connected space or the gas-density-varying space, are connected to the inter-electrode space C.

Figure 2:
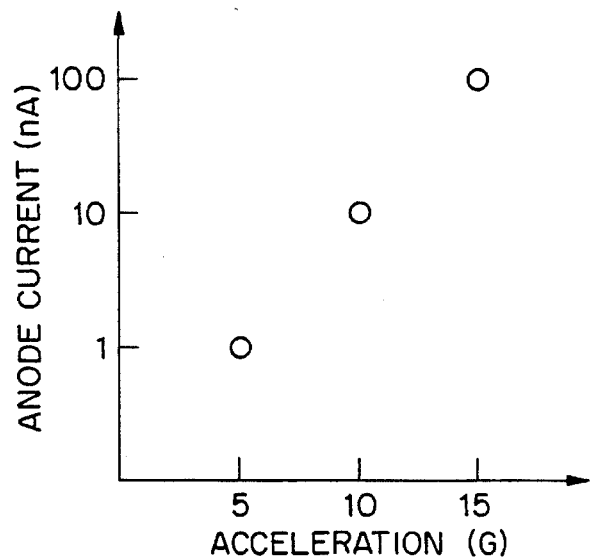
FIG. 2 is a graph showing the change of the anode current as a function of acceleration in the first embodiment of the accelerometer according to the present invention shown in FIG. 1.

As shown in FIG. 2, a graph showing the change of the anode current as a function of acceleration in X or –X direction when a voltage of 200 V is applied between the electrodes of the miniature diode vacuum tube according to the first embodiment, the logarithm of the anode current increases substantially linearly with increasing magnitude of the acceleration. In addition, the cathode 11 of the miniature diode vacuum tube of the first embodiment is a cold cathode.

Because the electric field between the anode 12 and the cathode 11 affects the work function at the boundary surface of the cathode 11 and narrows the surface potential width, electrons are emitted from the cold cathode 11 by the Schottky effect, i.e., a tunneling effect. When the miniature diode vacuum tube 10 is subject to acceleration, inertial force is exerted on the emitted electrons e and the atoms or molecules of the enclosed gas M distributed uniformly in the sealed-off, miniature diode vacuum tube 10. Since the inertial force of the electron is essentially negligible due to its light mass, the emitted electrons e travel in a straight line to the anode 12.

When the miniature diode vacuum tube 10 is subject to the acceleration in X direction, atoms or molecules of the gas M, which are much heavier than the electrons, are affected by substantial inertial force. Accordingly, the local density of the gas M in the connected space A increases, and the local density of the gas M decreases in the inter-electrode space C of the sealed-off tube 10. As a result of this gas-density variation, the collision cross section of the emitted electrons becomes larger in the connected space A behind the cathode 11 and smaller in the inter-electrode space C. The anode current increases in response to the decreased collision cross section of the emitted electrons.

When the miniature diode vacuum tube is subject to the acceleration in –X direction, the local density of the gas M in the connected space B behind the anode 12 increases, and the local density of the gas M in the inter-electrode space C decreases. As in the case of acceleration in X direction, the anode current once again increases in response to the decreased collision cross section of emitted electrons in the inter-electrode space C.

Since the anode current changes as a function of the magnitude of acceleration occurring when the miniature diode vacuum tube is accelerated along an axis defined by the two electrodes, i.e., in X direction or in –X direction, the magnitude of the acceleration is measured by detecting the change of the anode current. When the direction of acceleration a tilts by e degrees from the axis defined by the two electrodes, i.e., X direction or –X direction, the projected component (a·cos Θ) is responsible for variation in the density distribution of the gas.

Since the above-described electron emission phenomenon occurring inside the miniature vacuum tube is substantially immune to temperature variations, the accelerometer according to the first embodiment of the present invention ensures steady anode current values substantially unaffected by temperature variations. Further, since the gas enclosed within the miniature vacuum tube is uniformly distributed regardless of the temperature in the tube as long as the miniature vacuum tube is not accelerated, and since variation of the gas density distribution is linearly proportional to variation of the acceleration experienced by the miniature vacuum tube, the operational integrity of the accelerometer according to the present invention is substantially immune from temperature variations.

Figure 3A:
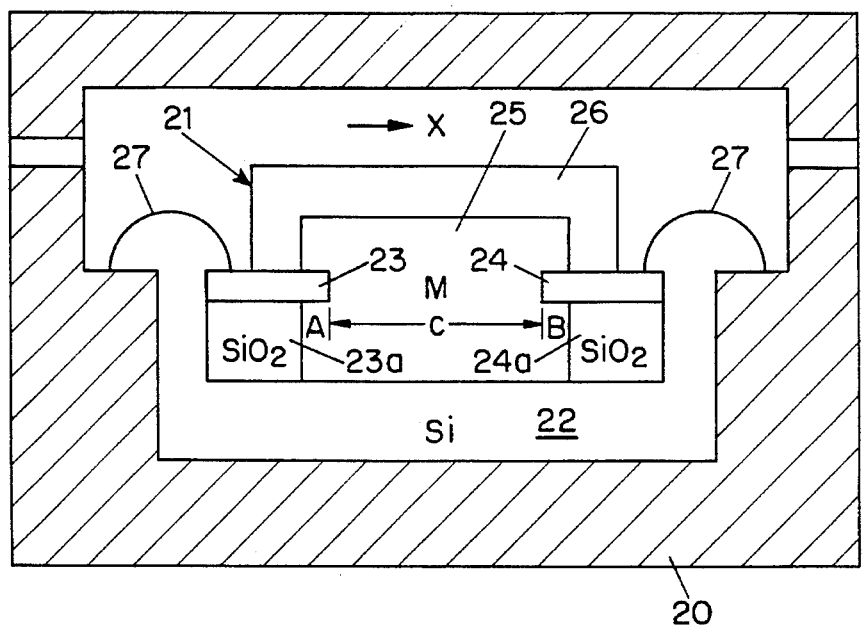
FIG. 3(a) is a sectional view showing the second embodiment of the accelerometer according to the present invention.

As seen in FIG. 3(a), a sectional view of an accelerometer according to the second embodiment of the present invention, this accelerometer consists of a micro vacuum tube manufactured via the micro-machining technique and mounted in a package 20. A micro vacuum tube 21 contains a wolfram cold cathode 23 formed on a silicon oxide layer 23a, which layer is in turn deposited on a first end portion of a silicon substrate 22. The vacuum tube 21 also contains a wolfram anode 24 formed on a silicon oxide layer 24a, which layer is in turn deposited on a second end portion of the silicon substrate 22. The anode 24 and the cold cathode 23 face each other via an inter-electrode space C of an internal space 25 of the vacuum tube 21. The internal space 25, which contains a dilute Ar gas, is defined by a sealing member 26, the two electrodes 23 and 24, the silicon oxide layers 23a and 24a, and the silicon substrate 22. The reference numeral 27 designates a bonding wire.

Figure 3B:
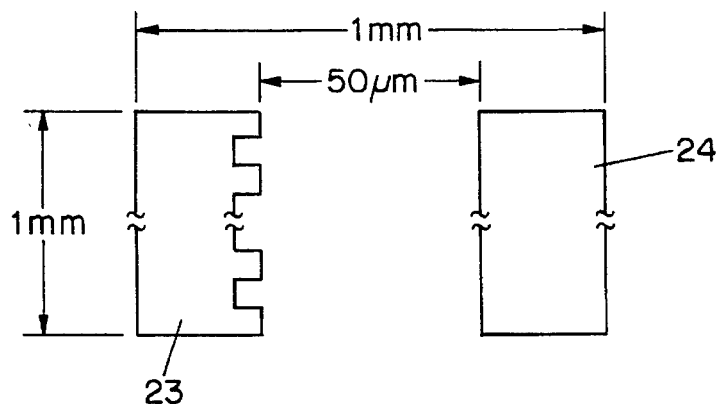
FIG. 3(b) is a top plan view showing the cathode and the anode of the second embodiment of the accelerometer according to the present invention shown in FIG. 3(a)

The micro vacuum tube 21 according to the second embodiment of the present invention is very small: it is 600 μm in thickness, 1 mm in width, and 1 mm in length. The cold cathode 23 is made of wolfram film of 0.2 μm in thickness, and its front side, i.e., the side facing the anode 24, is formed into comb-toothlike tips, as shown in FIG. 3(b), which is a top plan view of the electrodes 23 and 24. The anode 24 is also made of wolfram film of 0.2 μm in thickness, and its front side, i.e., the side facing the cold cathode 23, is flat. The front side or face of the cold cathode 23 projects laterally beyond the side of the silicon oxide layer 23a like an eave, and the front side or face of the anode 24 also projects laterally beyond the side of the silicon oxide layer 24a like an eave.

By virtue of the relative arrangements of the cold cathode 23 and the respective silicon oxide layer 23a, a connected space A, which extends laterally from the side face of the silicon oxide layer 23a to a vertical line drawn coplanar with the front face of the cold cathode 23, is formed. Similarly, a connected space B, which extends laterally from the side face of the silicon oxide layer 23a to a vertical line drawn coplanar with the front face of the anode 24, is formed by virtue of the relative arrangements of the anode 24 and the respective silicon oxide layer 24a.

Figure 4:
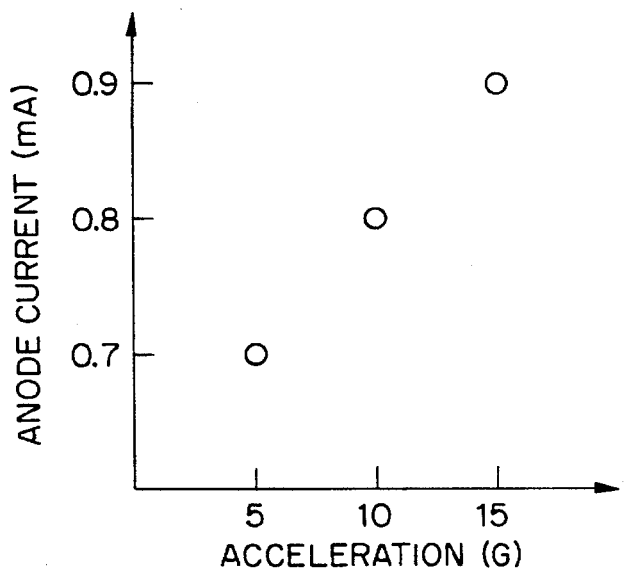
FIG. 4 is a graph showing the change of the anode current as a function of acceleration in the second embodiment of the accelerometer according to the present invention shown in FIG. 3(a)

FIG. 4 is a graph showing the change of the anode current as a function of acceleration in X direction or in −X direction experienced by the micro vacuum tube when a voltage of 100 V is applied between the electrodes of the micro vacuum tube. As shown in FIG. 4, the change in anode current is linearly proportional to the change in acceleration.

In the micro vacuum tube 21 shown in FIG. 3(a), similar to the miniature vacuum tube 10 of FIG. 1, the variation of gas densities between the connected space A or B and the inter-electrode space C increases as the magnitude of acceleration increases, i.e., as the acceleration increases, the gas density of the connected space A or B increases and the gas density of the inter-electrode space C decreases. In response to the decrease in the density of gas in the inter-electrode space C, the anode current increases linearly. Because the micro vacuum tube 21 of FIG. 3(a), which is manufactured via the micro-machining technique, doesn't rely on a semiconductor gauge, and because the tube 21 utilizes a combination of an electron emission phenomenon immune to temperature variations and a pinching effect of electron flow enhanced by density variation of the enclosed gas M caused by acceleration of the vacuum tube, the operational characteristics of the micro vacuum tube 21 is substantially immune to temperature variations. Further, the selection and arrangement of the components of the second embodiment facilitates substantial reduction of the accelerometer's dimensions and production cost.

Figure 5A:
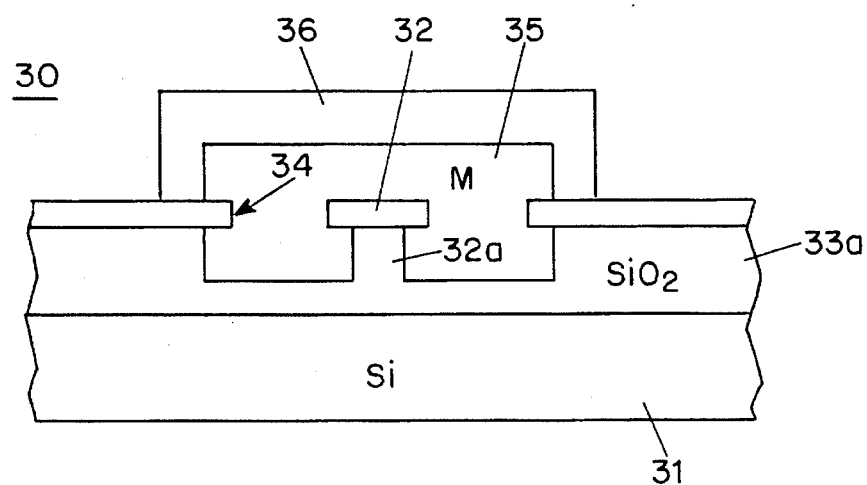
FIG. 5(a) is a sectional view showing the third embodiment of the accelerometer according to the present invention.
Figure 5B:
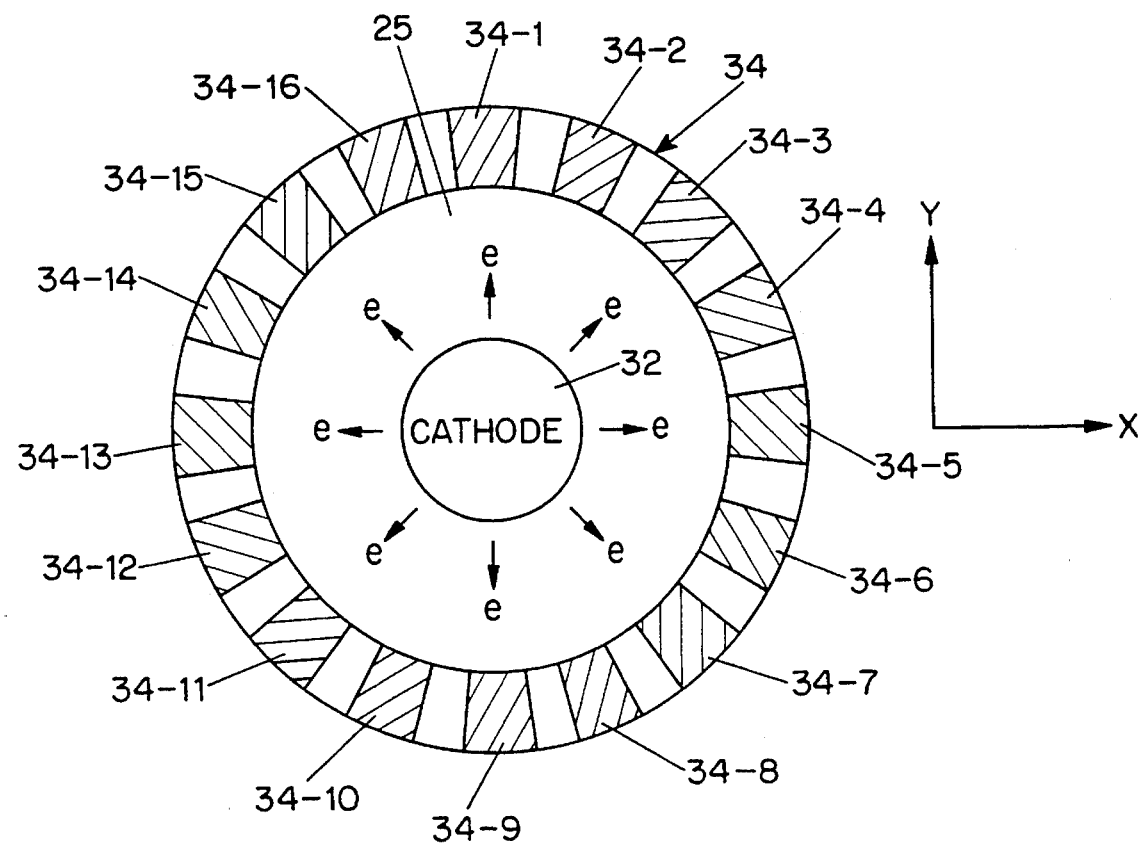
FIG. 5(b) is a top plan view of the third embodiment of the accelerometer according to the present invention shown in FIG. 5(a)

As shown in FIGS. 5(a) and 5(b), a sectional view showing the third embodiment of the accelerometer according to the present invention and a top plan view of the third embodiment, respectively, this accelerometer consists of a micro vacuum tube 30 also manufactured via the micro-machining technique. The micro vacuum tube 30 contains a circular, cold cathode disk 32 formed on a silicon oxide layer 32a, which layer is in turn formed on a silicon substrate 31. The tube 30 also contains a plurality of anodes 34 formed on a silicon oxide layer 33a, which is in turn formed on the silicon substrate 31. The anodes 34 concentrically surround the cold cathode 32 on the same horizontal plane as the cold cathode 32. In addition, a sealing member 36 is disposed on top of the plurality of anodes 34, thereby creating an internal space 35 in which a dilute Ar gas, designated by letter M, is contained.

In the third embodiment illustrated in FIGS. 5(a) and 5(b), the plurality of anodes 34 consist of 16 anode disks 34-1 to 34-16 separated from each other and arranged on a circle concentric with the cathode 32. The anode/cathode arrangement shown in FIG. 5(b) is a disk-edge type field emission structure, and the spacing between the cathode and the anode disk is 50 μm.

Figure 6:
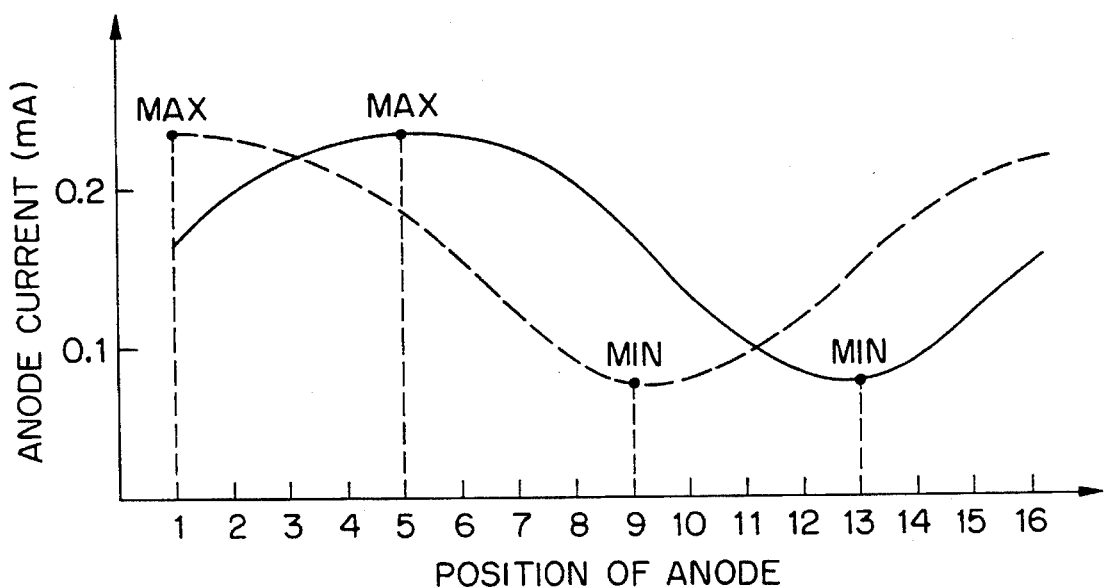
FIG. 6 is a graph showing the change of the anode current as a function of direction of acceleration in the third embodiment of the accelerometer according to the present invention shown in FIG. 5(a)
Figure 7:
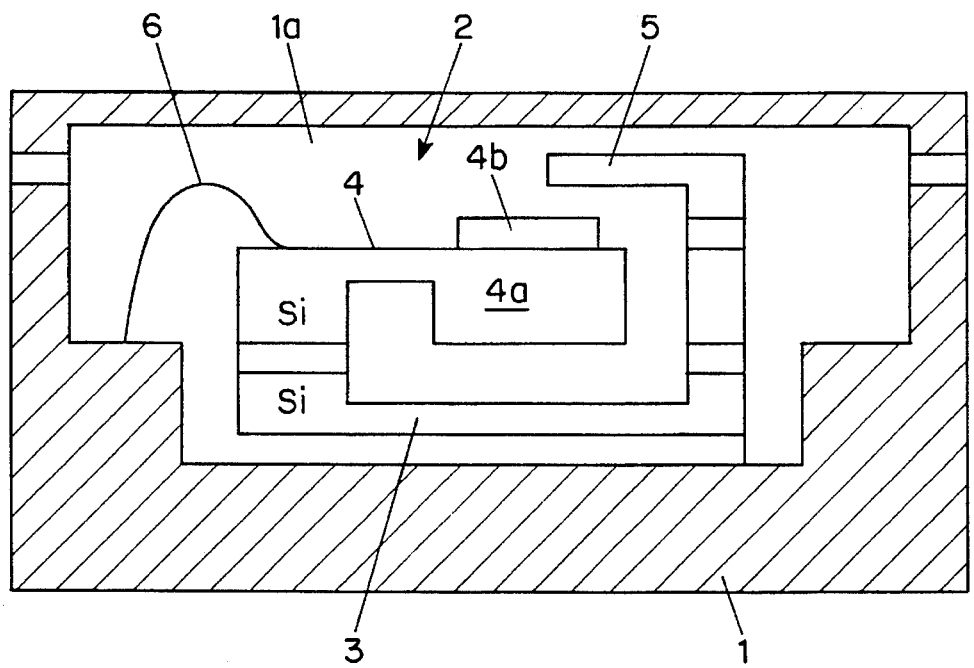
FIG. 7 is sectional view showing a prior art semiconductor accelerometer manufactured via the micro-machining technique.

The micro vacuum tube 30 containing the independent anode disks 34-1 to 34-16 can detect magnitude of the acceleration and its two dimensional direction. When the micro vacuum tube 30 is subject to acceleration in X direction, inertial force is exerted on the gas M in −X direction. As a result, the density of the gas M decreases on the right hand side and increases on the left hand side of the internal space 35 of FIG. 5(b). In response to this change in gas density, an anode current distribution represented by the solid line in FIG. 6 is obtained. When the micro vacuum tube 30 is subject to acceleration in X direction, e.g., 10 G, the anode current shows a maximum value (MAX) on the anode disk 34-5 and a minimum value (MIN) on the anode disk 34-13. As the magnitude of acceleration increases, the difference between the maximum and minimum values (amplitude) is enlarged.

Next, when the micro vacuum tube 30 is subject to acceleration in Y direction, inertial force is exerted on the gas M in −Y direction. Since the density of the gas M decreases in the upper area and increases on lower area of the internal space 25 of FIG. 5(b) in response to the exertion of inertial force, an anode current distribution represented by the broken line in FIG. 6 is obtained. When the micro vacuum tube 30 is subject to the acceleration, e.g., 10 G, in Y direction, the anode current shows a maximum value (MAX) on the anode disk 34-1 and a minimum value (MIN) on the anode disk 34-9. Once again, as the magnitude of acceleration increases, the difference between the maximum and minimum values (amplitude) is enlarged.

As can be seen from the above discussion, the orientation of the anode, the current of which shows a maximum on the anode current distribution, corresponds to the direction of the acceleration. Therefore, the accelerometer according to the third embodiment of the present invention can detect two dimensional direction of acceleration and its magnitude from the amplitude value of the anode current distribution.

Figure 8:
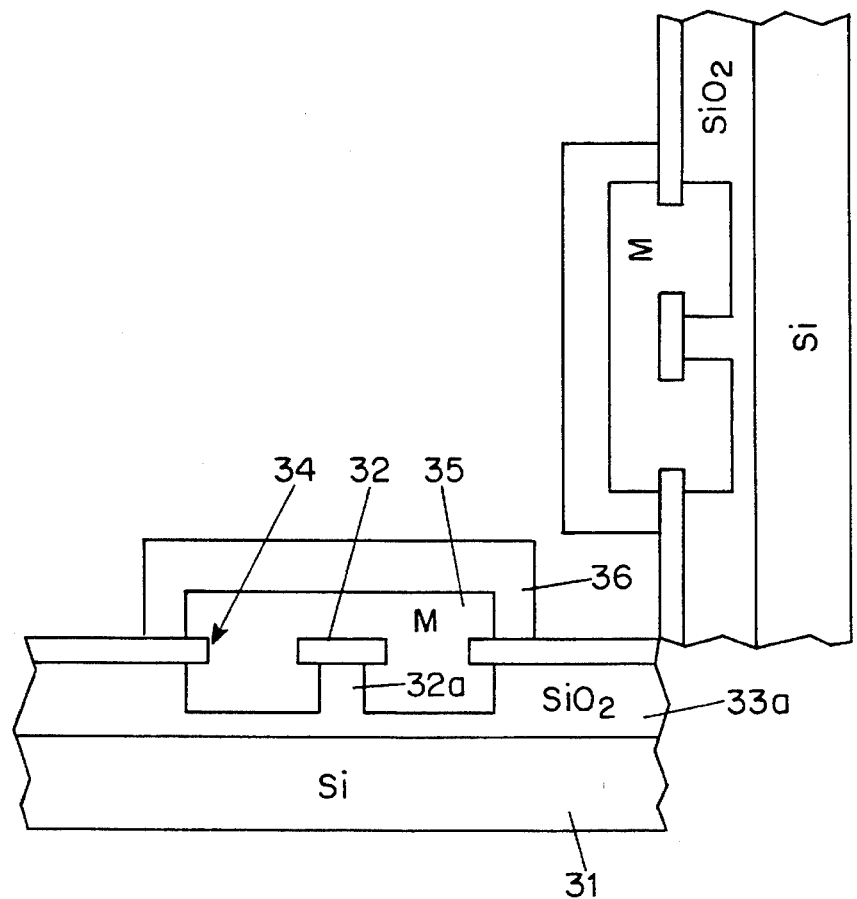
FIG. 8 is a sectional view showing yet another embodiment of the accelerometer according to the present invention.

Although the present invention has been described in conjunction with preferred embodiments, these embodiments are merely for illustrative purposes and the present invention should not to be construed as being limited to these preferred embodiments. It should be readily apparent to those skilled in the art that many variations and modifications are possible. For example, an accelerometer consisting of two micro vacuum tubes 30, shown in FIGS. 5(a) and 5(b), arranged orthogonal to each other can detect three dimensional direction of the acceleration. The present invention is intended to encompass this particular embodiment, which is illustrated in FIG. 8.

We claim:

1. A device for measuring acceleration comprising:
   a sealed tube containing a gas, said tube having a gas-density-varying space;
   a cold cathode located within the sealed tube; and
   an anode located within the sealed tube and directly facing said cold cathode on a substantially same plane, said anode being separated from said cold cathode by an inter-electrode space through which an anode current flows, said inter-electrode space being connected to the gas-density-varying space within the sealed tube;
   wherein the density of the gas in said inter-electrode space varies as a function of acceleration experienced by the sealed tube, whereby acceleration is measured by means of the magnitude of the anode current varying as a function of acceleration experienced by the sealed tube when a constant voltage is applied between the cold cathode and the anode.

2. The device according to claim 1, wherein the gas contained in the sealed tube comprises Argon.

3. The device according to claim 2 made in accordance with a method in which the sealed tube is formed by micro-machining a silicon wafer.

4. The device according to claim 2, wherein the sealed tube is an elongated tube, the cold cathode and the anode are positioned at opposing longitudinal end regions of the sealed tube, and the gas-density-varying space comprises a region of the sealed tube extending from the cold cathode to an adjacent longitudinal end of the sealed tube.

5. The device according to claim 2, wherein the sealed tube is an elongated tube, the cold cathode and the anode are positioned at opposing longitudinal end regions of the sealed tube, and the gas-density-varying space comprises a region of the sealed tube extending from the anode to an adjacent longitudinal end of the sealed tube.

6. The device according to claim 2, wherein the sealed tube is an elongated tube, the cold cathode and the anode are positioned at opposing longitudinal end regions of the sealed tube, and the gas-density-varying space comprises a region of the sealed tube extending from the anode to an adjacent longitudinal end of the sealed tube and a region of the sealed tube extending from the cold cathode to an adjacent longitudinal end of the sealed tube.

7. The device according to claim 2, wherein the cold cathode and the anode are each disposed on top of a respective silicon oxide layer, and wherein said respective silicon oxide layers are in turn disposed on top of a silicon substrate.

8. The device according to claim 7, wherein the cold cathode extends laterally beyond the side face of the silicon oxide layer on which the cold cathode is disposed, and wherein the gas-density-varying space comprises a region of the sealed tube extending laterally from the side face of the silicon oxide layer on which the cold cathode is disposed to a vertical line drawn coplanar with the front face of the cold cathode laterally extending beyond the side face of the silicon oxide layer.

9. The device according to claim 7, wherein the anode extends laterally beyond the side face of the silicon oxide layer on which the anode is disposed, and wherein the gas-density-varying space comprises a region of the sealed tube extending laterally from the side face of the silicon oxide layer on which the anode is disposed to a vertical line drawn coplanar with the front face of the anode laterally extending beyond the side face of the silicon oxide layer.

10. The device according to claim 7, wherein the cold cathode and the anode each extend laterally beyond the side face of the respective silicon oxide layer on which the cold cathode and the anode are disposed, and wherein the gas-density-varying space comprises a region of the sealed tube extending laterally from the side face of the silicon oxide layer on which the cold cathode is disposed to a vertical line drawn coplanar with the front face of the cold cathode laterally extending beyond the side face of the silicon oxide layer on which the cold cathode is disposed and a region of the sealed tube extending laterally from the side face of the silicon oxide layer on which the anode is disposed to a vertical line drawn coplanar with the front face of the anode laterally extending beyond the side face of the silicon oxide layer on which the anode is disposed.

11. The device according to claim 3, wherein the sealed tube is an elongated tube, the cold cathode and the anode are positioned at opposing longitudinal end regions of the sealed tube, and the gas-density-varying space comprises a region of the sealed tube extending from the cold cathode to an adjacent longitudinal end of the sealed tube.

12. The device according to claim 3, wherein the sealed tube is an elongated tube, the cold cathode and the anode are positioned at opposing longitudinal end regions of the sealed tube, and the gas-density-varying space comprises a region of the sealed tube extending from the anode to an adjacent longitudinal end of the sealed tube.

13. The device according to claim 3, wherein the sealed tube is an elongated tube, the cold cathode and the anode are positioned at opposing longitudinal end regions of the sealed tube, and the gas-density-varying space comprises a region of the sealed tube extending from the anode to an adjacent longitudinal end of the sealed tube and a region of the sealed tube extending from the cathode to an adjacent longitudinal end of the sealed tube.

14. A device for measuring acceleration comprising:
    a sealed tube containing a gas;
    a cold cathode located within the sealed tube; and
    an anode located within the sealed tube and directly facing said cold cathode on a substantially same plane, said anode being separated from said cold cathode by an inter-electrode space through which an anode current flows;
    wherein the density of the gas in said inter-electrode space varies as a function of acceleration experienced by the sealed tube, whereby acceleration is measured by means of the magnitude of the anode current varying as a function of acceleration experienced by the sealed tube when a constant voltage is applied between the cold cathode and the anode.

15. The device according to claim 14, wherein said cold cathode is a circular disk and said anode comprises a plurality of mutually separated anode disks concentrically surrounding said cold cathode on a substantially same plane.

16. The device according to claim 15, wherein the gas contained in the sealed tube comprises argon.

17. The device according to claim 16 made in accordance with a method in which the sealed tube is formed by micro-machining a silicon wafer.

18. An apparatus for measuring acceleration in three dimensions, comprising:
    a first acceleration-measuring unit comprising a first sealed tube containing a gas, a first cold cathode and a first anode located within the first sealed tube and directly facing each other on a first plane, said first anode being separated from said first cold cathode by a first inter-electrode space through which a first anode current flows; and a second acceleration-measuring unit comprising a second sealed tube containing a gas, a second cold cathode and a second anode located within the second sealed tube and directly facing each other on a second plane, said second anode being separated from said second cold cathode by a second inter-electrode space through which a second anode current flows;

wherein the density of the gas in said first inter-electrode space varies as a function of acceleration experienced by the first sealed tube, whereby acceleration is measured by means of the magnitude of the first anode current varying as a function of acceleration experienced by the first sealed tube when a constant voltage is applied between the first cold cathode and the first anode, and wherein the density of the gas in said second inter-electrode space varies as a function of acceleration experienced by the second sealed tube, whereby acceleration is measured by means of the magnitude of the second anode current varying as a function of acceleration experienced by the second sealed tube when a constant voltage is applied between the second cold cathode and the second anode.

19. The apparatus according to claim 18 wherein the gas contained in the first and second sealed tubes comprises argon.

20. The apparatus according to claim 19 wherein the first plane defined by the first cold cathode and the first anode is substantially orthogonal to the second plane defined by the second cold cathode and the second anode.

* * * * *